United States Patent
Sohail et al.

(10) Patent No.: US 11,803,426 B2
(45) Date of Patent: Oct. 31, 2023

(54) DETERMINING A DEPLOYMENT SCHEDULE FOR OPERATIONS PERFORMED ON DEVICES USING DEVICE DEPENDENCIES AND REDUNDANCIES

(71) Applicant: Dell Products L.P., Round Rock, TX (US)

(72) Inventors: Mohamed Sohail, Sheikh Zayed (EG); Hung Dinh, Austin, TX (US); Parminder Singh Sethi, Ludhiana (IN); Mohammad Rafey, Bangalore (IN); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 557 days.

(21) Appl. No.: 17/137,733

(22) Filed: Dec. 30, 2020

(65) Prior Publication Data
US 2022/0206877 A1    Jun. 30, 2022

(51) Int. Cl.
| | | |
|---|---|---|
| G06F 9/52 | (2006.01) | |
| G06N 5/04 | (2023.01) | |
| G06N 20/00 | (2019.01) | |
| G06F 9/48 | (2006.01) | |

(52) U.S. Cl.
CPC .............. *G06F 9/52* (2013.01); *G06F 9/4881* (2013.01); *G06N 5/04* (2013.01); *G06N 20/00* (2019.01)

(58) Field of Classification Search
CPC ........................................................ G06F 9/52
See application file for complete search history.

(56) References Cited

PUBLICATIONS

Raleigh Gregory, Device Assisted Services Install, KR20110110838A, 2011 (Year: 2011).*
N. E. Helwig, "Multivariate Linear Regression," University of Minnesota, Jan. 17, 2017, 84 pages.
Neo4j Team, The Neo4j Getting Started Guide v4.1, https://neo4j.com/docs/getting-started/current/, 2020, 27 pages.
G. Jeh et al., "SimRank: A Measure of Structural-Context Similarity," In Proceedings of the 8th ACM SIGKDD International Conference on Knowledge Discovery and Data Mining, Jul. 2002, 11 pages.

(Continued)

*Primary Examiner* — Charlie Sun
(74) *Attorney, Agent, or Firm* — Ryan, Mason & Lewis, LLP

(57) ABSTRACT

An apparatus comprises a processing device configured to generate a model of a plurality of devices characterizing relationships between the devices, to build a device dependency chain for the devices based on the model, to predict workload for each of the devices in one or more time slots of a given time period, and to determine a deployment schedule for the devices based on the device dependency chain and the predicted workload. The processing device is also configured to utilize the deployment schedule to select a device of the devices on which to perform an operation, to determine whether the selected device corresponds to an additional device of the devices configured to operate in place of the selected device during performance of the operation, and to control performance of the operation on the selected device responsive to the determination of whether the selected device corresponds to the additional device.

20 Claims, 14 Drawing Sheets

(56) References Cited

PUBLICATIONS

R. N. Sucky, "Multivariate Linear Regression in Python Step by Step," https://towardsdatascience.com/multivariate-linear-regression-in-python-step-by-step-128c2b127171, Jun. 25, 2020, 8 pages.
Amazon Web Services, "Working with Deployments in CodeDeploy," https://docs.aws.amazon.com/codedeploy/latest/userguide/deployments.html, Accessed Dec. 10, 2020, 2 pages.
Wikipedia, "Criu," https://en.wikipedia.org/w/index.php?title=CRIU&oldid=952314185, Apr. 21, 2020, 3 pages.
U.S. Appl. No. 17/066,647 filed in the name of Mohammad Rafey et al. on Oct. 9, 2020, and entitled "Determining a Deployment Schedule for Operations Performed on Devices Using Device Dependencies and Predicted Workloads."

* cited by examiner

```
import pandas as pd
import numpy as np
from sklearn.linear_model import LinearRegression
from sklearn.metrics import mean_squared_error

# Read workload captured data.
df = pd.read_csv('device-workload-data.csv')
df.head()

# Input data provides data time slot wise workload data for devices on an hourly basis.
# Device management tool takes into account the captured data and performs a multi
# variate linear regression analysis to predict the workload for each time slot of the day.
y = df['workload-data-device']
x = df[['cpu-util', 'memory-util', 'availability', 'response-time', 'disk-util']]

# Define Multi Variate Linear Regression Model.
linear_regress = LinearRegression()

# Train Multi Variate Linear Regression Model.
linear_regress.fit(x,y)

# Workload Prediction.
y_pred = linear_regress.predict(x)
```

FIG. 11

DETERMINING A DEPLOYMENT SCHEDULE FOR OPERATIONS PERFORMED ON DEVICES USING DEVICE DEPENDENCIES AND REDUNDANCIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to techniques for managing information processing systems.

BACKGROUND

Devices, such as, for example, Internet of Things (IoT) devices, are becoming more intelligent and capable with respect to, for example, processing power and speed. For example, IoT device hardware platforms are becoming more powerful, and some IoT devices are equipped with modern software stacks. Large numbers of devices may be grouped together and centrally managed. Different subsets of the devices within a device pool may have different kinds of hardware and run various types or versions of operating systems, libraries and/or applications. When components of the devices need to be updated, updates may be pushed to a subset of the devices in the data center having the components in need of the updates. Such updates may be pushed to the different devices in a sequential and/or parallel fashion, which may cause problems with the operation of the devices in the device pool. Accordingly, there is a need for optimizing the deployment of updates or other actions to groups of devices.

SUMMARY

Illustrative embodiments provide techniques for determining deployment schedules for operations to be performed on devices using device dependencies and redundancies.

In one embodiment, an apparatus comprises at least one processing device comprising a processor coupled to a memory. The at least one processing device is configured to perform the steps of generating a model of a plurality of devices in an information technology infrastructure, the generated model characterizing relationships between the plurality of devices, building a device dependency chain for the plurality of devices based at least in part on the generated model characterizing the relationships between the plurality of devices, predicting workload for each of the plurality of devices in one or more time slots of a given time period, and determining a deployment schedule for the plurality of devices based at least in part on the device dependency chain and the predicted workload for each of the plurality of devices in the one or more time slots. The at least one processing device is further configured to perform the steps of utilizing the deployment schedule to select a device of the plurality of devices on which to perform an operation, determining whether the selected device corresponds to an additional device of the plurality of devices configured to operate in place of the selected device during performance of the operation, and controlling performance of the operation on the selected device responsive to the determination of whether the selected device corresponds to the additional device.

These and other illustrative embodiments include, without limitation, methods, apparatus, networks, systems and processor-readable storage media.

BRIEF DESCRIPTION OF THE DRAWINGS

FIG. 11 shows pseudocode for generating workload predictions for devices in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
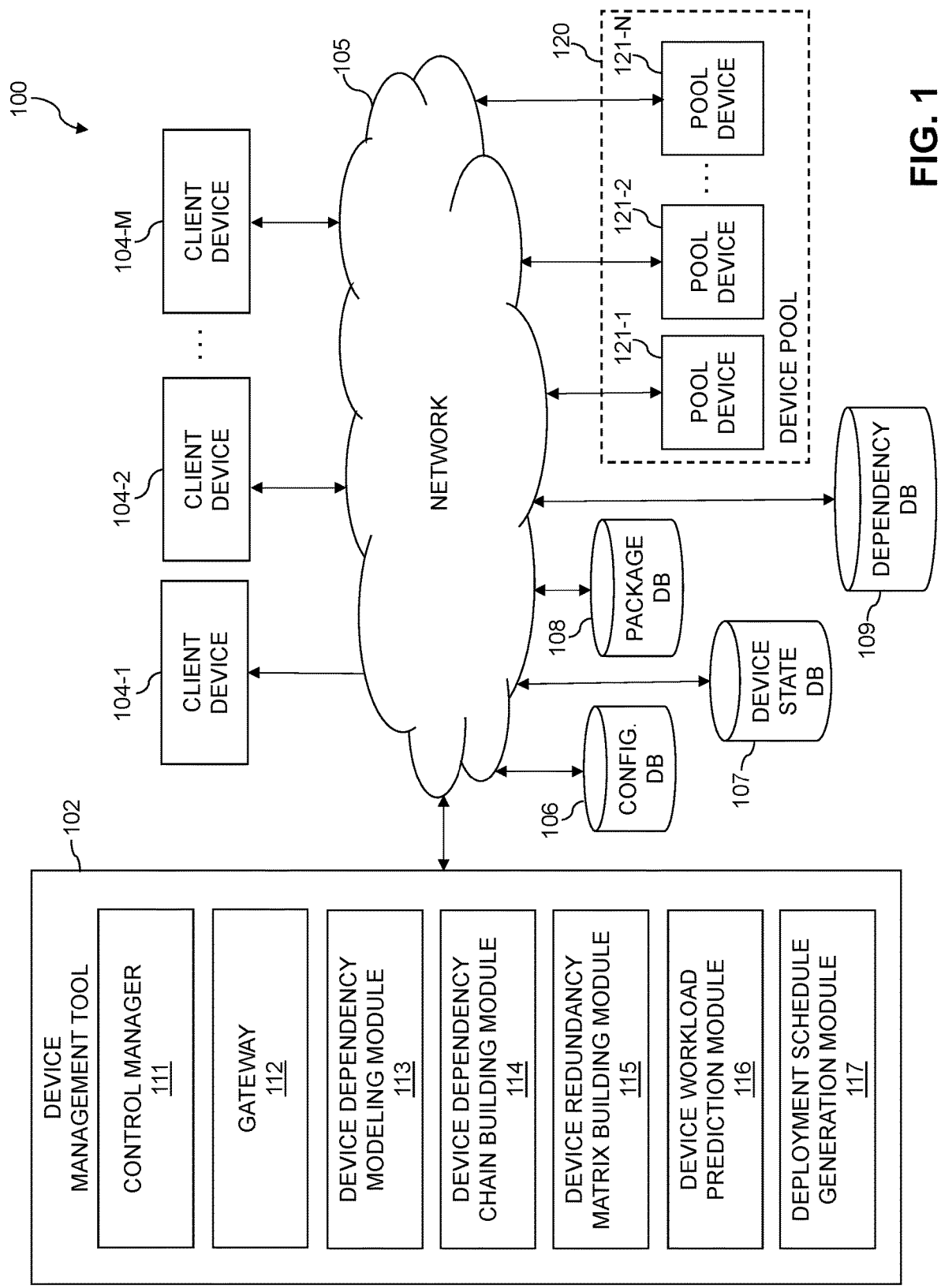
FIG. 1 is a block diagram of an information processing system configured for determining deployment schedules for operations to be performed on devices using device dependencies and redundancies in an illustrative embodiment.

FIG. 1 shows an information processing system 100 configured in accordance with an illustrative embodiment. The information processing system 100 is assumed to be built on at least one processing platform and provides functionality for determining deployment schedules for operations to be performed on devices using device dependencies and redundancies. The information processing system 100 includes a device management tool 102, which is coupled via a network 105 to a device pool 120 comprising a plurality of pool devices 121-1, 121-2, . . . 121-N (collectively, pool devices 121). The device pool 120 including the pool devices 121 is assumed to be accessed, over network 105, by client devices 104-1, 104-2, . . . 104-M (collectively, client devices 104). The system 100 also includes a configuration (config.) database (DB) 106, a device state database 107, a package database 108 and a dependency database 109 coupled to the network 105, which may store various information related to operation, configuration, operating systems, dependencies, applications and other components of devices 121 or assets of the device pool 120. The pool devices 121 or assets of the device pool 120 may be part of an information technology (IT) infrastructure, and may include, by way of example, physical and virtual computing resources. Physical computing resources may include physical hardware such as servers, storage systems, networking equipment, IoT devices, and other types of processing and computing devices including desktops, laptops, tablets, smartphones, etc. Virtual computing resources may include virtual machines (VMs), software containers also referred to as containers, etc.

The IoT devices can include passive and intelligent IoT devices. Such intelligent IoT devices include, but are not necessarily limited to, intelligent video cameras, autonomous smart vehicles and medical devices. The intelligent IoT devices may be deployed in, for example, cities and in industry automation and instrumentation, and may continuously generate and receive large volumes of big data for smart decision making using different artificial intelligence (AI) techniques. The IoT devices can be equipped with software stacks such as, for example, Linux®, Linux® microkernel and Clear Linux® operating systems. The pool devices 121 such as, for example, IoT devices, may work independently or interactively. For example, multiple video cameras may be configured at different angles to work interactively in the same area. Large pools of devices 121 generally require some form of central management, governance and control. Managing software and/or firmware installations, updates and/or upgrades is a challenging task for the large device pools, which current mechanisms are not equipped to handle.

The client devices 104 may comprise, for example, physical computing devices such as IoT devices, mobile telephones, laptop computers, tablet computers, desktop computers or other types of devices, which may be utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 105 is assumed to comprise a global computer network such as the Internet, although other types of networks can be part of the network 105, including a wide area network (WAN), low-power WAN (LPWAN), a local area network (LAN), a satellite network, a telephone or cable network, a cellular network, a wireless network such as a WiFi or WiMAX network, Bluetooth®, Zigbee®, or various portions or combinations of these and other types of networks.

The configuration database 106, device state database 107, package database 108 and dependency database 109 may be any type of database configured to store various information related to operation, configuration, operating systems, dependencies, applications and other components of devices or assets of the device pool 120. For example, the configuration database 106 maintains device information such as, for example, device identifiers (IDs), world-wide name (WWN) IDs, hardware specifications, access information, domain information, location codes, device serial numbers, logical partition (LPAR) and VM identifiers and/or names, and corresponding virtual server Internet Protocol (IP) addresses and/or names. The device state database 107 maintains details about a running status of a device 121 such as, for example, health historical workload information and performance metrics such as, but not necessarily limited to, throughput, latency, memory capacity and usage, response and completion time, channel capacity and bandwidth. The package database 108 maintains, for example, operating system images, packages and application container images. The dependency database 109 maintains device dependency information such as, for example, upgrade dependency details and deployment schedules.

The databases 106, 107, 108 and 109 in some embodiments are implemented using one or more storage systems or devices associated with the device management tool 102. In some embodiments, one or more of the storage systems utilized to implement the databases 106, 107, 108 and 109 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the device management tool 102, as well as to support communication between the device management tool 102 and other related systems and devices not explicitly shown.

In some embodiments, the client devices 104 may implement host agents that are configured for communication with the device management tool 102. The host agents implemented by the client devices 104 may be configured to interact with a graphical user interface and visualizations thereof that are produced by the device management tool 102 for presenting deployment schedules for devices 121 in the device pool 120. The host agents may permit users of the client devices 104 to interact with user interface features of the graphical user interface to view and possibly modify the deployment schedules, to initiate updates or other actions using the deployment schedules, etc.

It should be noted that a "host agent" as this term is generally used herein may comprise an automated entity, such as a software entity running on a processing device. Accordingly, a host agent need not be a human entity.

Although shown as separate from the client devices 104 and the device pool 120 in the FIG. 1 embodiment, it should be appreciated that the device management tool 102 may be implemented at least in part within one or more of the client devices 104 or at least in part within the device pool 120, or combinations thereof, in some embodiments.

The device management tool 102 in the FIG. 1 embodiment is assumed to be implemented using at least one processing device. Each such processing device generally comprises at least one processor and an associated memory, and implements one or more functional modules for controlling certain features of the device management tool 102. In the FIG. 1 embodiment, the device management tool 102 implements a control manager 111, a gateway 112, a device dependency modeling module 113, a device dependency chain building module 114, a device redundancy matrix building module 115, a device workload prediction module 116, and a deployment schedule generation module 117.

The control manager 111 is configured to monitor and control the components of the device management tool 102, including their software. In an illustrative embodiment, the control manager 111 comprises a cluster that utilizes a plurality of centralized metadata stores to perform the monitoring and control operations. The gateway 112 is configured to aggregate data and cache packages. For example, as explained further herein, pool devices 121 may have data dependencies (e.g., upstream and/or downstream dependencies) and/or logical dependencies (e.g., device must upgrade before being identified by a gateway) which require proper dependency management. Images may be pushed to gateway 112 then to devices 121, where in-place or rolling updates can be performed. In one or more embodiments, the gateway 112 is configured to function as a temporary image caching device to reduce bandwidth consumption over remote access.

The device dependency modeling module 113 is configured to generate a model of a plurality of devices 121 in the device pool 120. The generated model characterizes relationships between the plurality of devices 121. The device dependency chain building module 114 is configured to build a device dependency chain for the plurality of devices 121 based at least in part on the generated model characterizing the relationships between the plurality of devices 121.

The device redundancy matrix building module 115 analyzes configurations of the plurality of devices 121 to identify which of the devices 121 can operate in place of each other, so that when a device is disabled due to, for example, a software updating process, another of the devices can operate in place of the disabled device during the updating process. Based on the identification of devices that can operate in place of each other, the device redundancy matrix building module 115 builds a device redundancy matrix comprising relationships between at least a subset of the plurality of devices identified as being able to operate in place of one or more devices in the subset.

The device workload prediction module 116 is configured to predict workload for each of the plurality of devices in one or more time slots of a given time period. The deployment schedule generation module 117 is configured to determine a deployment schedule for the plurality of devices based at least in part on the device dependency chain and the predicted workload for each of the plurality of devices in the one or more time slots of the given time period. The device management tool 102 is configured to utilize the deployment schedule to select a device of the plurality of devices on which to perform an operation (e.g., software/firmware installation, update, upgrade or other deployment). The device management tool 102 uses the device redundancy matrix to determine whether the selected device corresponds to an additional device of the plurality of devices configured to operate in place of the selected device during performance of the operation. The device management tool 102 further controls performance of the operation on the selected device responsive to the determination of whether the selected device corresponds to the additional device.

It is to be appreciated that the particular arrangement of the device management tool 102, the control manager 111, the gateway 112, the device dependency modeling module 113, the device dependency chain building module 114, the device redundancy matrix building module 115, the device workload prediction module 116, and the deployment schedule generation module 117 illustrated in the FIG. 1 embodiment is presented by way of example only, and alternative arrangements can be used in other embodiments. As discussed above, for example, the device management tool 102, the control manager 111, the gateway 112, the device dependency modeling module 113, the device dependency chain building module 114, the device redundancy matrix building module 115, the device workload prediction module 116, and the deployment schedule generation module 117 may in some embodiments be implemented internal to one or more of the client devices 104, the device pool 120, or combinations thereof. As another example, the functionality associated with the control manager 111, the gateway 112, the device dependency modeling module 113, the device dependency chain building module 114, the device redundancy matrix building module 115, the device workload prediction module 116, and the deployment schedule generation module 117 may be combined into fewer modules, or separated across more modules with the multiple modules possibly being implemented with multiple distinct processors or processing devices.

At least portions of the control manager 111, the gateway 112, the device dependency modeling module 113, the device dependency chain building module 114, the device redundancy matrix building module 115, the device workload prediction module 116, and the deployment schedule generation module 117 may be implemented at least in part in the form of software that is stored in memory and executed by a processor.

It is to be understood that the particular set of elements shown in FIG. 1 for determining deployment schedules for operations to be performed on devices using device dependencies and redundancies is presented by way of illustrative example only, and in other embodiments additional or alternative elements may be used. Thus, another embodiment may include additional or alternative systems, devices and other network entities, as well as different arrangements of modules and other components.

The device management tool 102 and other portions of the system 100 may be part of cloud infrastructure as will be described in further detail below. The cloud infrastructure hosting the device management tool 102 may also host one or more of the client devices 104, the databases 106, 107, 108 and 109 and the device pool 120.

The device management tool 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The device management tool 102, client devices 104, databases 106, 107, 108 and 109 and the device pool 120 or components thereof may be implemented on respective distinct processing platforms, although numerous other arrangements are possible. For example, in some embodiments at least portions of the device management tool 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the device management tool 102, client devices 104, databases 106, 107, 108 and 109, device pool 120, or portions or components thereof, to reside in different data centers. Numerous other distributed implementations are possible. The device management tool 102 or portions thereof can also be implemented in a distributed manner across multiple data centers.

Additional examples of processing platforms utilized to implement the device management tool 102 and other portions of the system 100 in illustrative embodiments will be described in more detail below in conjunction with FIGS. 13 and 14.

It is to be appreciated that these and other features of illustrative embodiments are presented by way of example only, and should not be construed as limiting in any way.

Figure 2:
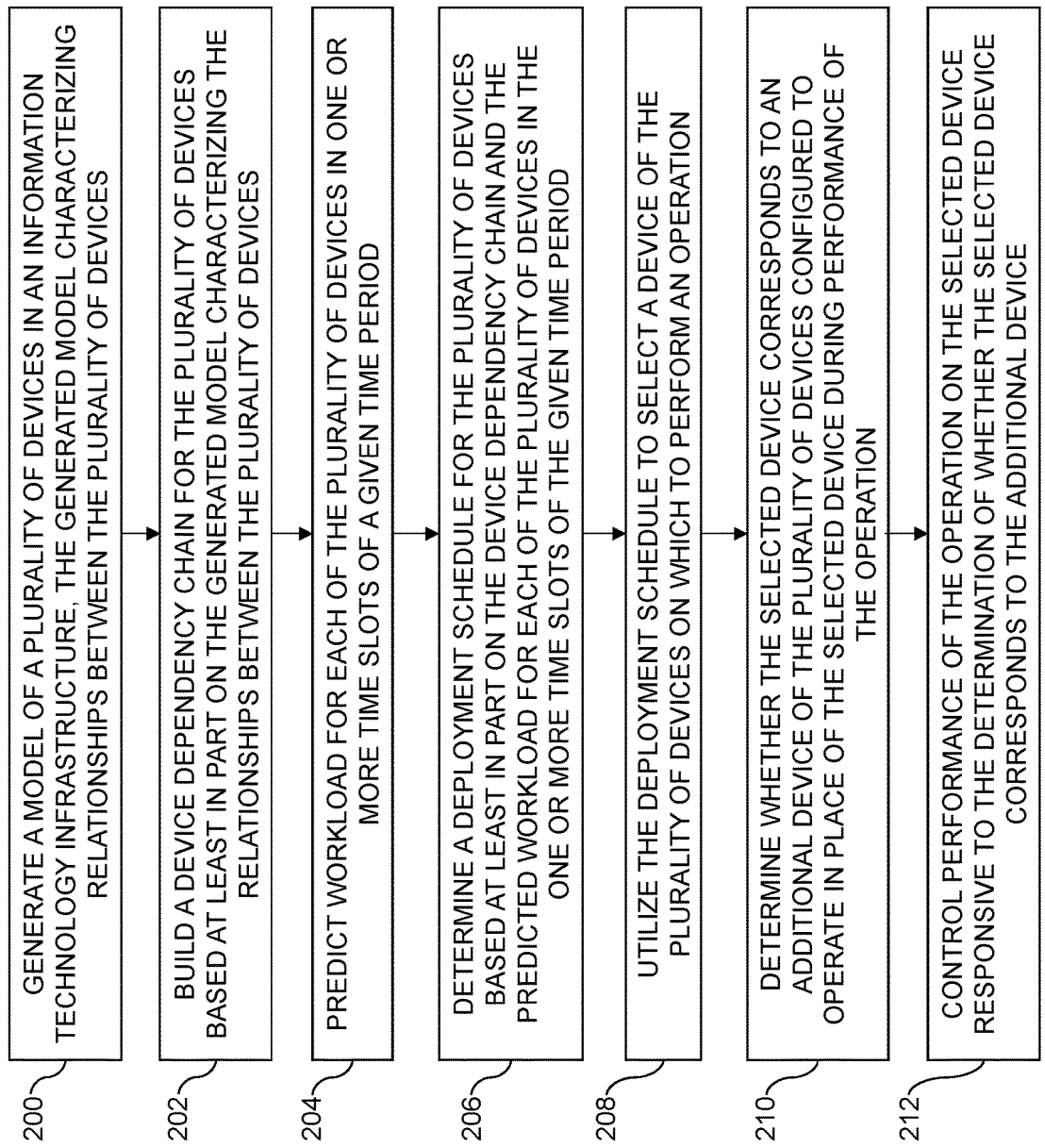
FIG. 2 is a flow diagram of an exemplary process for determining deployment schedules for operations to be performed on devices using device dependencies and redundancies in an illustrative embodiment.

An exemplary process for determining deployment schedules for operations to be performed on devices using device dependencies and redundancies will now be described in more detail with reference to the flow diagram of FIG. 2. It is to be understood that this particular process is only an example, and that additional or alternative processes for determining deployment schedules for operations to be performed on devices using device dependencies and redundancies may be used in other embodiments.

In this embodiment, the process includes steps 200 through 212. These steps are assumed to be performed by the device management tool 102 utilizing the control manager 111, the gateway 112, the device dependency modeling module 113, the device dependency chain building module 114, the device redundancy matrix building module 115, the device workload prediction module 116, and the deployment schedule generation module 117. The process begins with step 200, generating a model of a plurality of devices in an IT infrastructure. The generated model characterizes relationships between the plurality of devices. The plurality of devices may comprise IoT devices, etc. The model of the plurality of devices comprises a directed weighted graph with nodes representing the plurality of devices and edges between the nodes representing call relationships between the plurality of devices. A given edge weight associated with a given edge between a first node and a second node in the directed weighted graph may be based at least in part on a number of requests between the first node and the second node and an amount of data exchanged between the first node and the second node. The given edge weight comprises a normalized edge weight.

In step 202, a device dependency chain is built for the plurality of devices based at least in part on the generated model characterizing the relationships between the plurality of devices. Step 202 may comprise computing an overall dependency score for each of the plurality of devices, the overall dependency score for a given device comprising a sum of pairwise dependency scores characterizing activity between the given device and each of at least a subset of other ones of the plurality of devices that have call relationships with the given device. The process continues with step 204, predicting workload for each of the plurality of devices in one or more time slots of a given time period. The given time period may comprise a day, and the one or more time slots may comprise hours in the day. Step 204 may comprise utilizing a machine learning regression analysis. The machine learning regression analysis may comprise a multivariate linear regression analysis. The multivariate linear regression analysis is based at least in part on two or more of processor utilization of the plurality of devices, memory utilization of the plurality of devices, availability of the plurality of devices, response time of the plurality of devices, and disk utilization of the plurality of devices.

A deployment schedule for the plurality of devices is determined in step 206 based at least in part on the device dependency chain and the predicted workload for each of the plurality of devices in the one or more time slots of the given time period. Step 206 may comprise for a given one of the one or more time slots of the given time period, identifying a subset of the devices whose lowest predicted workload is in the given time slot and selecting an order in which the identified subset of the devices whose lowest predicted workload is in the given time slot in decreasing order of dependency scores obtained from the device dependency chain. In step 208, the deployment schedule is utilized to select a device of the plurality of devices on which to perform an operation. The plurality of devices may host an application, and the operation to be performed on the plurality of devices may comprise updating the application. The deployment schedule may specify a sequence in which the operation is to be performed on the plurality of devices.

The process further includes step 210, determining whether the selected device corresponds to an additional device of the plurality of devices configured to operate in place of the selected device during performance of the operation. In an illustrative embodiment, determining whether the selected device corresponds to the additional device comprises analyzing configurations of the plurality of devices to build a device redundancy matrix comprising relationships between at least a subset of the plurality of devices identified as being able to operate in place of one or more devices in the subset, and identifying a relationship between the selected device and the additional device on the device redundancy matrix. In step 212, performance of the operation on the selected device is controlled responsive to the determination of whether the selected device corresponds to the additional device. For example, when the operation comprises updating at least one application on the selected device, the operation is performed using a rolling update mechanism responsive to an affirmative determination that the selected device corresponds to the additional device. Performance of the operation using the rolling update mechanism comprises notifying the additional device of the operation to be performed on the selected device, and configuring an application on the additional device to operate in place of the at least one application on the selected device during the updating of the at least one application on the selected device. The operation is performed using an in-place update mechanism responsive to a negative determination that the selected device corresponds to the additional device.

As noted herein, large numbers of devices such as, for example IoT devices, are being used across a wide spectrum of application domains. Managing these large pools of devices with respect to deploying, maintaining and managing software/firmware upgrades has a number of challenges that are not addressed by conventional upgrade techniques. A typical large pool of IoT devices may include various types of devices in a managed domain having different kinds of hardware and running different types or versions of operating systems, libraries and/or applications. Current mechanisms for management and control of component upgrades or updates promote or push an upgrade to a specific subset of IoT devices in a random fashion or based on the workload of individual ones of the subset of devices. In some cases, the upgrade proceeds in a sequential fashion. In other cases, the upgrade proceeds or runs at least partially in parallel.

Conventional implementations do not have functionality or built-in intelligent features for optimizing upgrade or other deployment schedules systematically. Conventional implementations for management and control of software and/or firmware deployment therefore fail to take into account and consider the current state of each device before pushing an upgrade. In some cases, upgrades are resource-intensive processes. Pushing upgrades by random or fixed methods can decrease the performance of devices and applications hosted by the devices. Conventional approaches for pushing upgrades tend to be fundamentally heuristics-based, and are therefore too costly, risky and unreliable resulting in unexpected outages and other negative impacts on end-user satisfaction.

Illustrative embodiments provide techniques for optimizing deployment schedules for upgrade or other actions to be performed on devices systematically and intelligently. To do so, some embodiments formulate a device dependency chain (more generally, an asset dependency chain) using a directed weighted graph. For example, the device dependency chains define relationships between different multiple IoT devices in a pool. Such devices in the pool can be dependent on or independent of each other with respect to their serviceability and their installed software stacks (e.g., in terms of prerequisites, corequisites, and other parameters that are important for building upgrade paths). In one or more embodiments, an order of devices receiving software and/or firmware upgrades and/or installations is defined based on determined upstream, downstream and logical dependencies between devices. Advantageously, this solution takes into consideration device or other asset conditions, resource utilization, and availability from a historical data perspective to predict the right order to push upgrades in a manner that minimizes impact and optimizes deployment across multiple devices.

The techniques employed in one or more embodiments advantageously minimize impact of devices being offline by taking into consideration whether devices in a pool can take over operations of devices that are being upgraded. For example, the embodiments utilize rolling upgrade mechanisms to trigger backup (e.g. redundant) devices to be used in place of devices that are offline during upgrades so that functions associated with the devices being upgraded proceed uninterrupted. The embodiments also recognize when there are no redundant devices associated with a particular device, so that upgrades can be performed using appropriate im-place upgrade mechanisms.

One or more embodiments also advantageously provide failure management by providing for storage in databases 106 and/or 108 of device properties such as, for example, hostname, networking configurations and feature configurations, in files that can be read by any firmware version. This ensures that despite any rollbacks, devices remain connected and running. Alternatively, in one or more embodiments, setup and configuration files of a current firmware version are erased and a new setup process for a device is executed with the old firmware loaded while accessing the previously stored configuration files.

Figure 3:
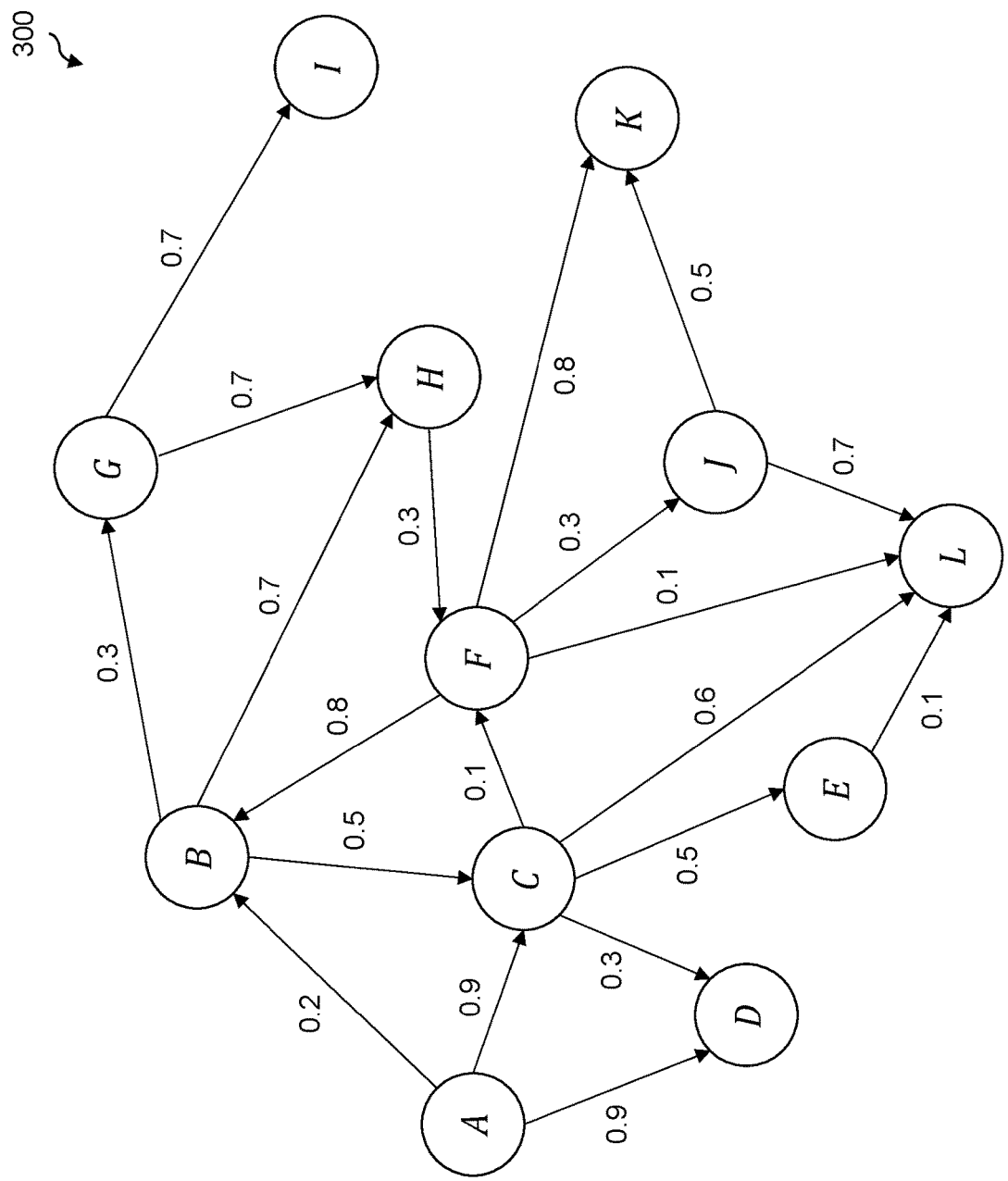
FIG. 3 shows a directed weighted graph of device dependencies in an illustrative embodiment.

In some embodiments, the device management tool 102 and, more specifically, the device dependency modeling module 113, models the various devices 121 or servers and their associated invocation-dependency patterns as a directed weighted graph, with the devices 121 or servers as nodes and their call relationships as edges. Edge weights are calculated based on an objective function with multiple determining factors, such as $n_1, n_2, \ldots, n_m$. For example, factor $n_1$ may denote a number of requests, factor $n_2$ may denote data in and data out, etc. The weights may be further normalized between 0 and 1, with 0.0 representing least active call relationships and 1.0 representing most active call relationships. FIG. 3 shows an example directed weighted graph 300, in which unidirectional edge weights denote the relative extent of server or device activity, dependency and relationships among each other. The devices in the graph 300 are denoted A through L.

Figure 4:
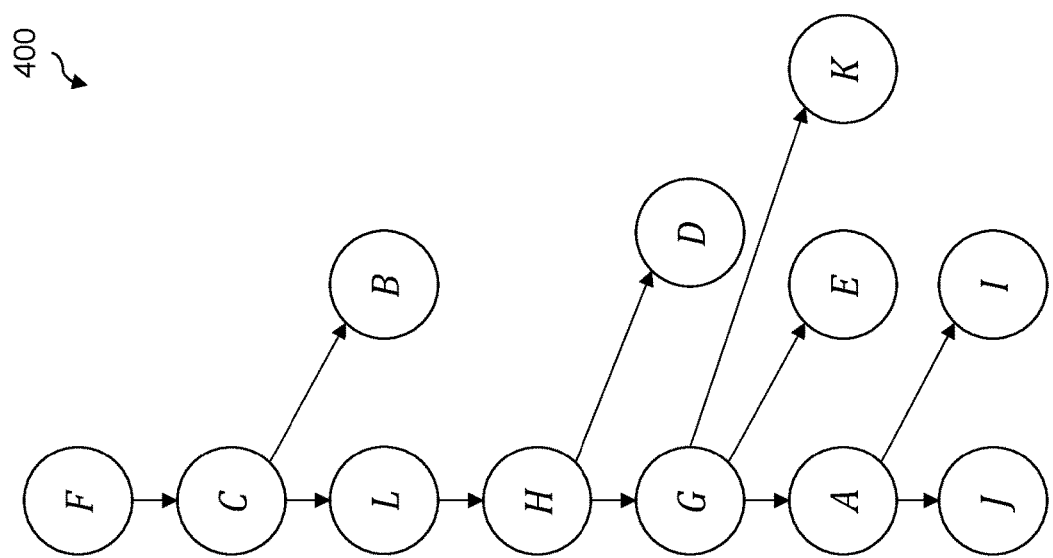
FIG. 4 shows a device dependency chain generated for a set of devices in an illustrative embodiment.

Based on the weighted graph, the device management tool 102 and, more specifically, the device dependency chain building module 114, identifies or generates a device dependency chain by analyzing and computing device similarity scores based on their activity patterns. In some embodiments, SimRank is used for computing the device similarity scores. In other embodiments, different types of algorithms may be used to compute the device similarity scores. The device with the lowest score in the device dependency chain has the least dependencies in terms of overall device dependency chain activities. The device with the maximum score has the most dependencies relative to the device dependency chain activities. Equations 1 and 2 below compute the IN and OUT scores, respectively, between devices A and B:

$$S(A, B) = \frac{C}{|I(A)| * |I(B)|} \sum_{i=1}^{|I(A)|} \sum_{j=1}^{|I(B)|} S(Ii(A), Ij(B)) \quad (1)$$

$$S(A, B) = \frac{C}{|O(A)| * |O(B)|} \sum_{i=1}^{|O(A)|} \sum_{j=1}^{|O(B)|} S(Oi(A), Oj(B)) \quad (2)$$

where C is a constant between 0 and 1. If there are no IN-neighbors in either A or B (in other words, if $I(A)=\emptyset$ or $I(B)=\emptyset$, then $S(A, B)=0$. The IN and OUT scores from Equations 1 and 2 combined denote the extent of device activity between A and B. The device which has the maximum score is placed on the top of the device dependency chain, followed by the next highest scoring device, and so on to generate the device dependency chain. Devices with a same score are placed on the same level of the device dependency chain. FIG. 4 shows an example device dependency chain 400 for devices denoted A through L. It should be noted that the example device dependency chain 400 in FIG. 4 does not correspond to the specific weight values shown in the directed weighted graph 300 of FIG. 3.

Figure 5:
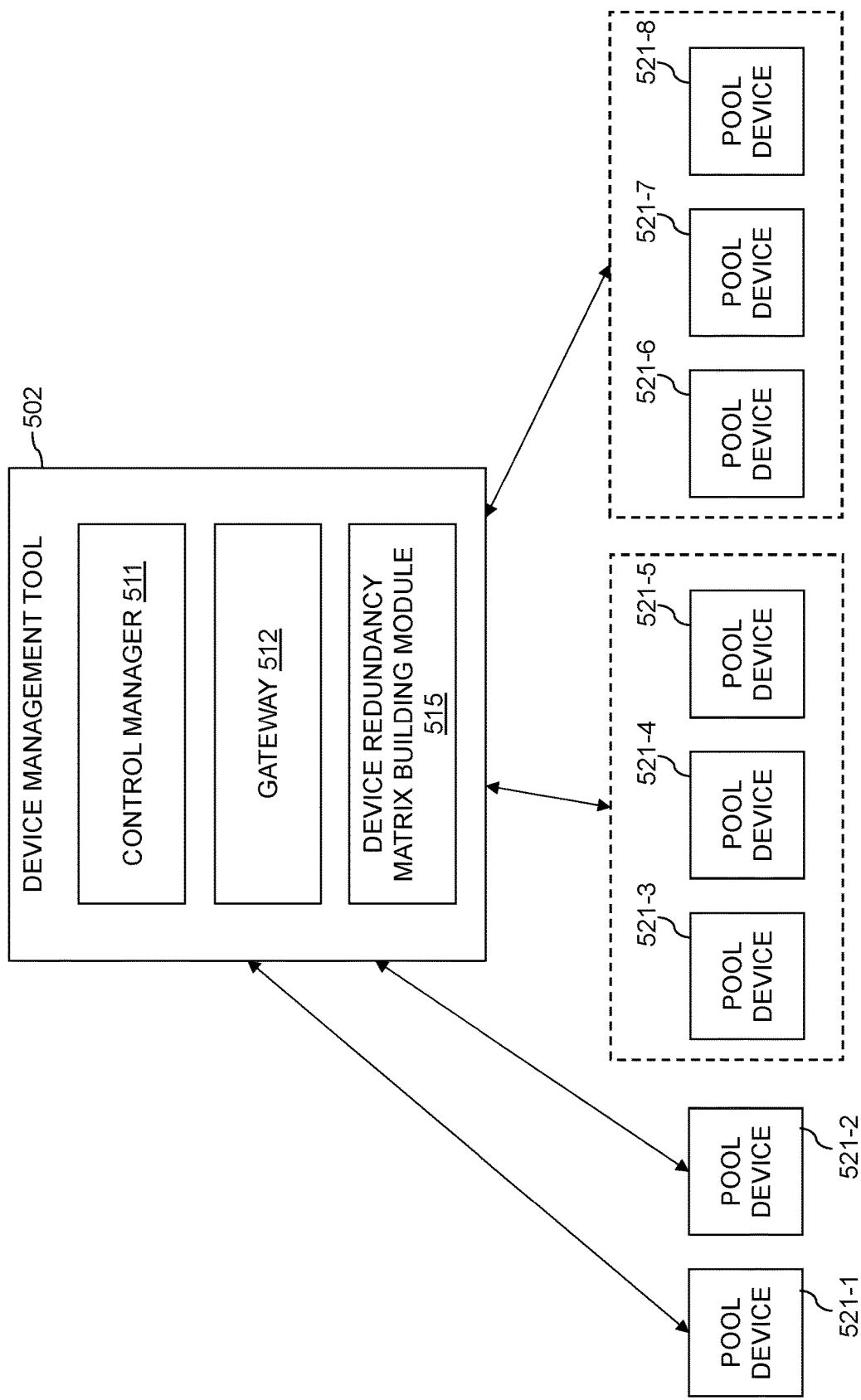
FIG. 5 illustrates a device management architecture based on whether redundant devices are available in an illustrative embodiment.

Referring to the device management architecture in FIG. 5, in a non-limiting operational example, devices 521-1 and 521-2 do not correspond to any other devices which may be configured to operate in their place during performance of a software and/or firmware update, upgrade or other deployment operation, and devices 521-3, 521-4 and 521-5 respectively correspond to devices 521-6, 521-7 and 521-8, which are configured to operate in their place during performance of a software and/or firmware update, upgrade or other deployment operation. This information is used by the device management tool 502, and more particularly, the device redundancy matrix building module 515, to construct a device redundancy matrix and to control updating, upgrading or other deployment operations based on whether the devices receiving the deployment operations correspond to redundant devices, which may function while the devices on which the deployment operations are being performed are offline. Control manager 511, gateway 512 and device redundancy matrix building module 515 are the same or similar to the control manager 111, gateway 112 and device redundancy matrix building module 115 described in connection with FIG. 1.

For example, updating, upgrading or other deployment operations can be performed on devices 521-3, 521-4 and 521-5 corresponding to redundant devices 521-6, 521-7 and 521-8 using a rolling update mechanism or an in-place update mechanism. Such operations on devices 521-1 and 521-2, which do not correspond to redundant devices, are performed using an in-place update mechanism, but not a rolling update mechanism.

Rolling updating is supported when a device being upgraded corresponds to another nearby device which can be configured to take over the traffic of the device being upgraded. In an illustrative example, three video cameras may serve a highly secure area. If video camera 1 is in upgrade mode, video cameras 2 and/or 3 can be configured to scan a larger area that covers the area normally scanned by video camera 1. However, if a device has no corresponding standby device or is not part of the device redundancy matrix, then rolling updates will not be supported and in-place updates are used instead.

Figure 6:
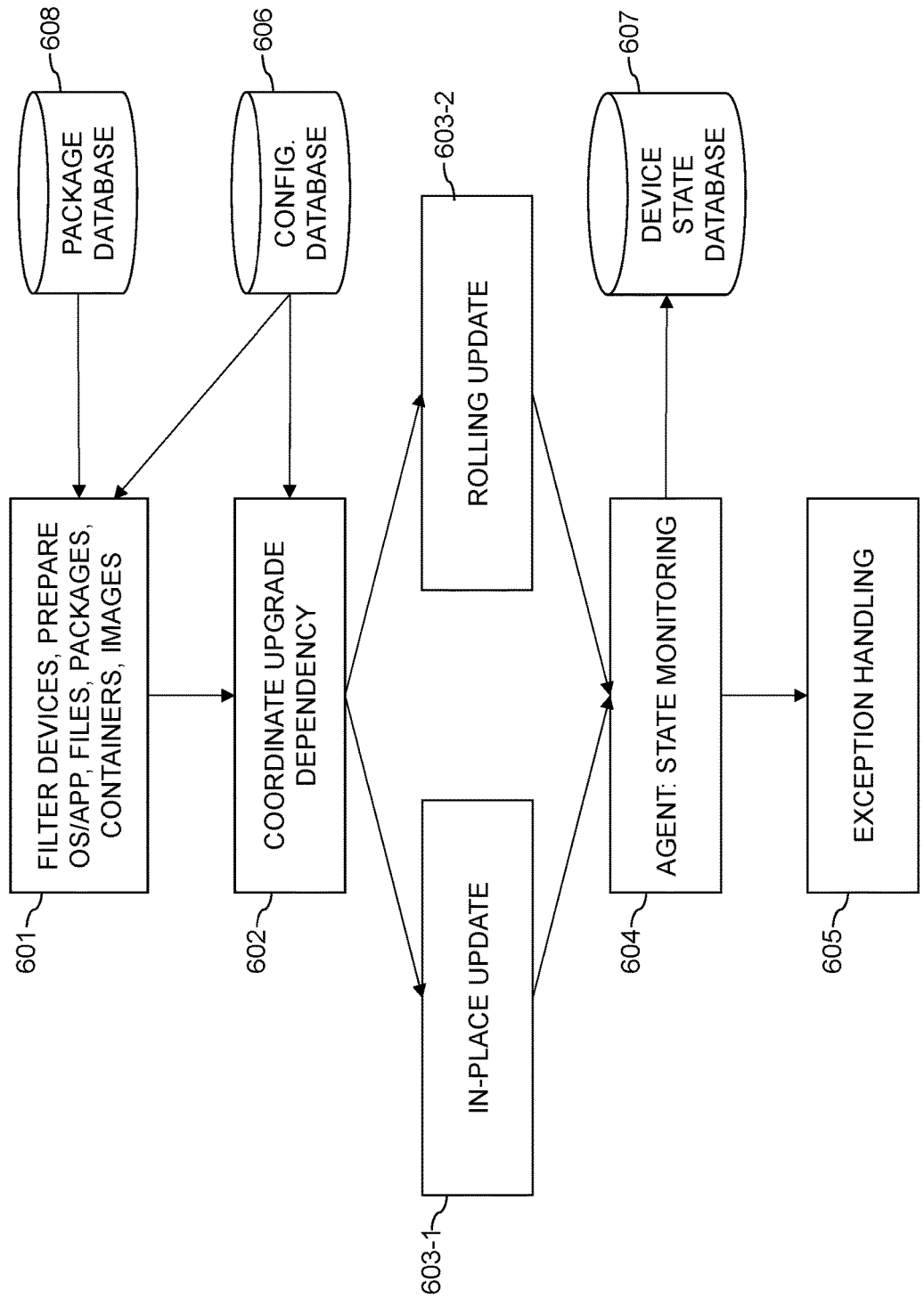
FIG. 6 shows a process flow for determining a type of update in an illustrative embodiment.

Referring to FIG. 6, a process flow for determining a type of update is shown. According to one or more embodiments, different levels of update granularity are supported by the device management tool. For example, from smaller granularity to larger granularity, updates may be implemented on a per file basis, such as for some configuration files, on a per package basis, such as for packages of numbers of application files, files in library, etc., on a per container basis, such as in the case of application logic, and on an operating system image basis, where all components are refreshed and large amounts of data are transferred.

In step 601, candidate devices for updates are filtered and files, packages, containers and/or images are prepared for the update process. Configuration and package databases 606 and 608 are queried to filter candidate devices and check images to determine version prerequisites. In step 602, upgrade dependency is coordinated through the generation of a dependency graph, and files, packages, containers and/or images are pushed to the gateway and then to the devices being updated. Referring to steps 603-1 and 603-2, in-place updating is performed if there are no corresponding redundant devices, or a rolling update is performed is there are corresponding redundant devices within an upgrade domain. The gateway may function as a temporary image caching device to reduce bandwidth consumption over remote access.

Devices, such as pool devices 121, may run specific task and/or applications on containers (e.g., Docker containers) on operating systems such as, for example, Linux® or Linux® microkernel. According to one or more embodiments, on each such device, there is an agent which collects running status, as well as software configuration and versions information for the device. Referring to step 604, the agent using the device state database 607 monitors device status and application health. In step 605, if an exception occurs, exception handling is triggered, such as, for example, rolling back an update, upgrade and/or deployment.

Figure 7:
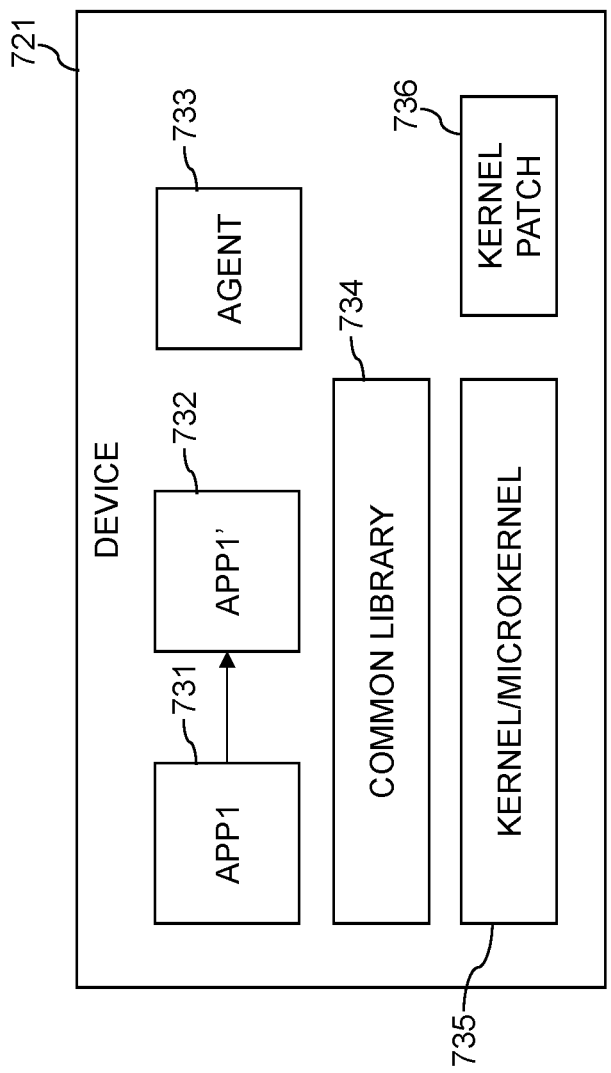
FIG. 7 is a block diagram illustrating an in-place update scenario in an illustrative embodiment.

Referring to FIG. 7, an in-place update is performed on a device 721. If there is a determination that there is no corresponding device that may temporarily operate as a substitute for a device being updated, an in-place device update is performed. For an in-place update, an application (e.g., APP1 731) is stopped, and the latest application revision is installed. The new version of the application (e.g., APP1' 732) is started and validated. APP1' 732 can represent a new application container instance.

Kernel patch 736, container fast launch and container level checkpoint capabilities can be leveraged to perform updates in a short time period. For example, in-place updates of a kernel/microkernel 735 or container can be performed in seconds using, for example, kernel patch 736 and/or container fast launch and container level checkpoint capabilities. A kernel switch is performed once the update finishes.

In some embodiments, at least part of the original running application (APP1 731) is frozen and checkpointed to persistent storage in, for example, common library 734, as a collection of files. If necessary, as a failure management mechanism, the collection of files may be accessed and used to restore and run the application from the point at which it was frozen. The device 721 includes an agent 733, which collects running status, as well as software configuration and versions information for the device 721 as described herein.

Figure 8:
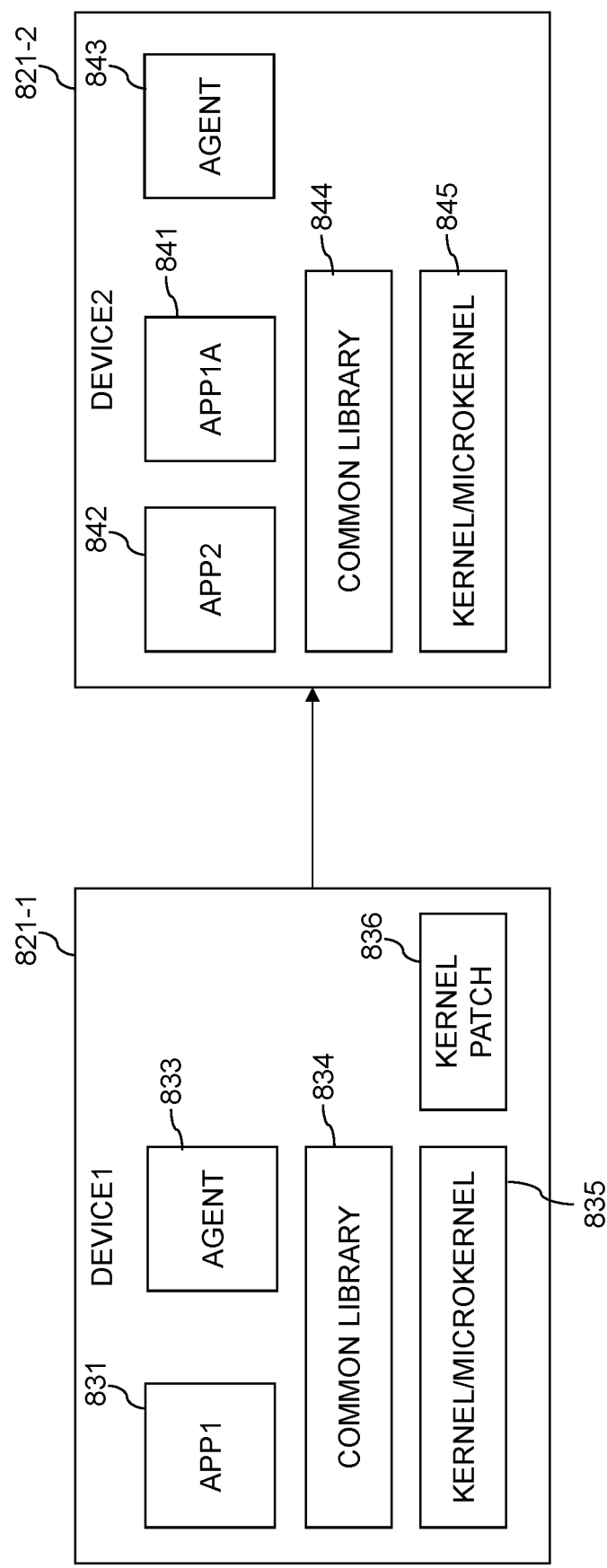
FIG. 8 is a block diagram illustrating a rolling update scenario in an illustrative embodiment.

Referring to FIG. 8, a rolling update is performed on a device 821-1, assuming there is a corresponding device 821-2 that may temporarily operate as a substitute for a device 821-1 being updated. Similar to device 721, devices 821-1 and 821-2 each include an agent 833, 843, a common library 834, 844, and a kernel/microkernel 835, 845. Device 821-1 further includes a kernel patch 836. If a relationship is identified between device 821-1 and device 821-2 on a device redundancy matrix, to update an application APP1 831 on device 821-1, the agent 833 of device 821-1 notifies the agent 843 of device 821-2 that an update is to be performed. An existing application APP2 842 is configured or a new application APP1A 841 is launched on device 821-2 to take over operation of APP1 831 while APP1 831 is being updated. If necessary, the operating system on device 821-1 is updated first, then APP1 831 is updated. A reboot of device 821-1 may be performed if necessary. Updates on device 821-2 can be performed using a similar process to that for updating device 821-1 where an existing application (e.g., APP1 831) is configured or a new application is launched on device 821-1 to take over operation of an application on device 821-2 (e.g., APP2 842), while that application on device 821-2 is being updated.

Figure 9:
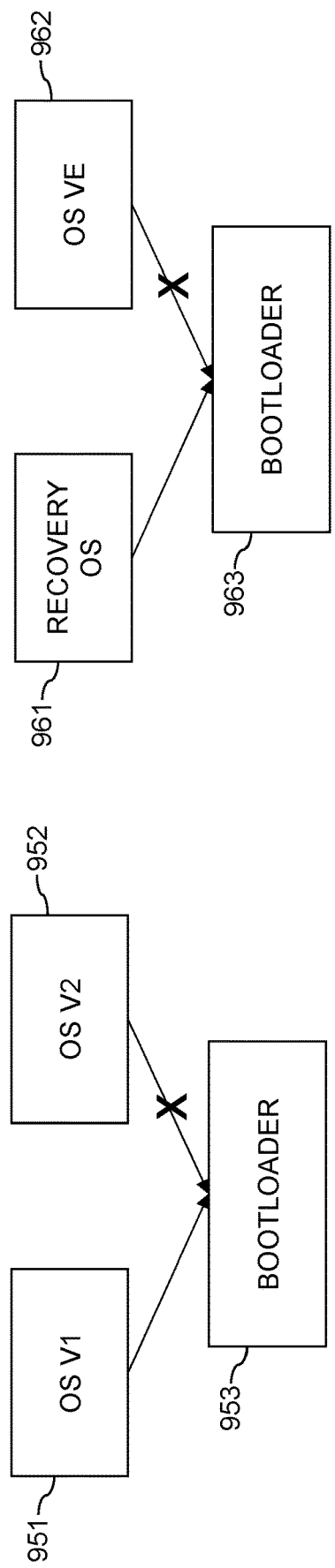
FIG. 9A is a block diagram illustrating deployment of a previous version of an operating system in the event of a failure of a second version of the operating system in an illustrative embodiment.
FIG. 9B is a block diagram illustrating deployment of a recovery version of an operating system in the event of a failure of an existing version of the operating system in an illustrative embodiment.

FIG. 9A is a block diagram illustrating deployment of a previous version of an operating system (OS V1 951) in the event of a failure of a second version of the operating system (OS V2 952). FIG. 9B is a block diagram illustrating deployment of a recovery version of an operating system (Recovery OS 961) in the event of a failure of an existing version of the operating system (OS VE 962). For example, one or more recovery or previous versions of packages, containers or operating system images are maintained for the devices 121, for example, in the package database 108 or in other databases in the devices 121 or elsewhere. In case of a failure, such as, for example, an application container launch failure, an agent in the device (e.g., device 121) can monitor the running status of the device, log the failure event, and launch a previous or recovery version of the container if configurable. In another example, in the case of an operating system image bootup failure, a previous version of the image can be maintained as a standby or a rescue image can be maintained for urgent recovery. A bootloader 953, 963 can be used to execute the deployment of the previous or recovery operating system versions.

Figure 10:
FIG. 10 shows a table of workload data for devices in an illustrative embodiment.

The device management tool 102 and, more specifically, the device workload prediction module 116, collects workload data metrics on a periodic basis (e.g., an hourly basis or some other configurable time period) for each device it manages in a device pool and/or IT infrastructure. FIG. 10 shows a table 1000 illustrating sample workload data for a device. The table 1000 includes columns for a device identifier (ID), a date time slot, central processing unit (CPU) utilization percentage (%), memory utilization percentage (%), availability percentage (%), response time in milliseconds (ms), and disk utilization percentage (%). The device workload prediction module 116 then performs a multivariate regression analysis using machine learning to predict the workload for each slot of a day (or some other configurable time period) for the device. FIG. 11 shows pseudocode 1100 for a multivariate linear regression workload prediction.

The device management tool 102 and, more specifically, the deployment schedule generation module 117, then establishes an optimum deployment slot for each device belonging to a device dependency chain, where the optimum deployment slot for a particular device corresponds to the time slot in the day (or other configurable time period) in which that device is predicted to have the lowest workload. The deployment schedule generation module 117 takes into consideration the position of each device in the device dependency chain and its workload prediction for the day (or other configurable time period) to determine an optimum deployment time slot and execution sequence schedule (e.g., for rolling out upgrades to the devices in the device dependency chain).

To populate the overall schedule for rolling out updates, or performing some other action such as performing maintenance on the devices in the device dependency chain, an algorithm is used to select the devices to update in each time slot. To begin, a subset of devices whose lowest workload prediction time slot is the earliest in a given time period (e.g., a day) are identified, and from among the identified subset of devices, the devices with the lowest dependency scores in the device dependency chain are determined. Both such factors (e.g., the workload predictions and the dependency scores) are used to determine which devices to schedule in a particular time slot. In this way, the update or other action deployment schedule is built to ensure that the devices with the least dependency and predicted workload are updated first, followed by devices with relatively more dependencies. It should be noted that each device belonging to an entity space is part of a device dependency chain. Depending on the data set, there is a possibility that a device dependency chain has only one device member, also referred to as an orphan member.

Figure 12:
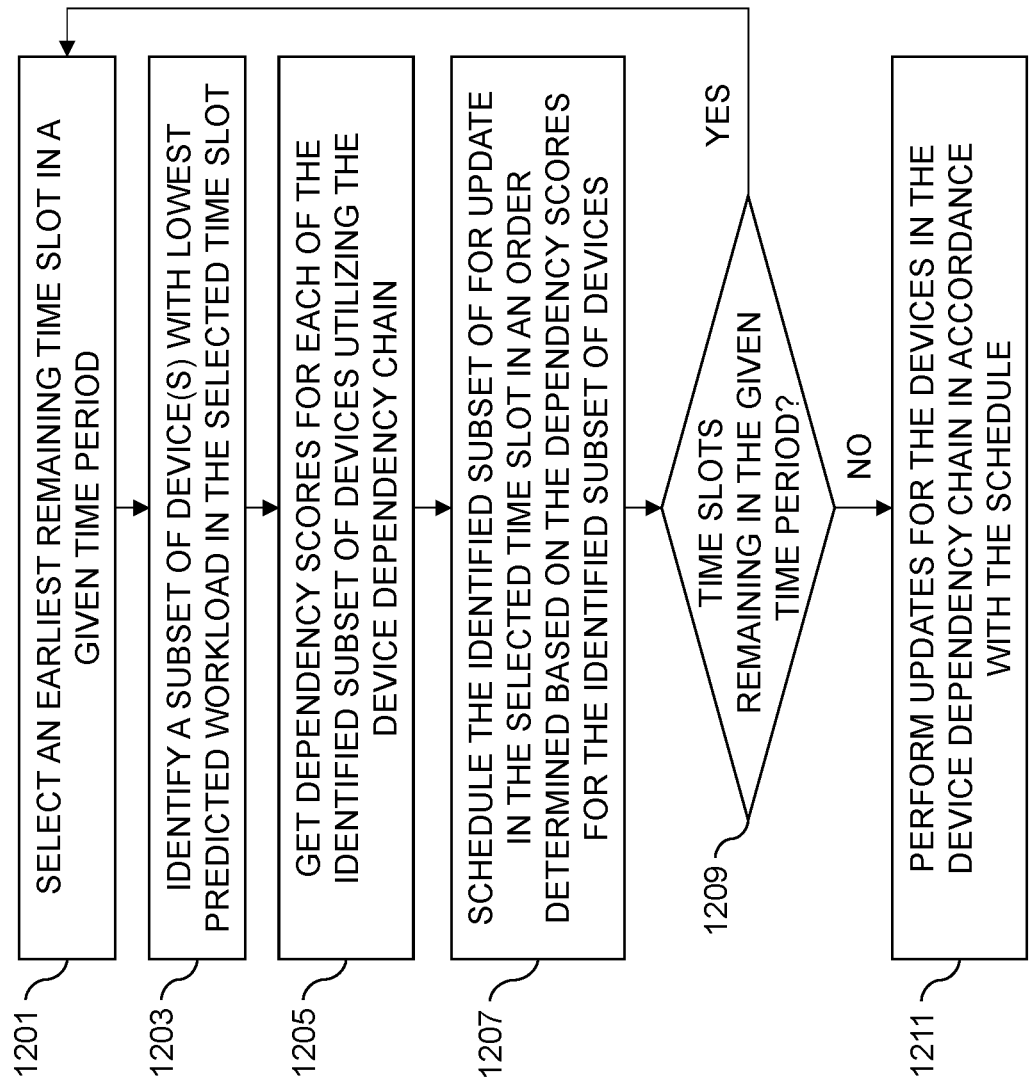
FIG. 12 shows a process flow for building a deployment schedule using a device dependency chain and workload predictions for devices in an illustrative embodiment.

FIG. 12 shows a process flow for generating a schedule for deploying updates to a set of devices characterized by a device dependency chain generated as described above. In step 1201, an earliest remaining time slot in a given time period is selected. In step 1203, a subset of devices with a lowest predicted workload in the selected time slot are identified. In step 1205, dependency scores for each of the identified subset of devices are obtained utilizing the device dependency chain. Then, in step 1207, the identified subset of devices from step 1203 are scheduled for update in the time slot selected in step 1201 in an order determined based on the dependency scores for the identified subset of devices. For example, the identified subset of devices may be scheduled for update starting with the device having the lowest dependency score and then continuing with devices having the next lowest dependency score until all devices in the identified subset are scheduled. A determination is made in step 1209 as to whether there are any remaining time slots in the given time period (e.g., a time slot in which devices have not yet been scheduled for update). If yes, the process returns to step 1201 to again select the earliest remaining time slot. If no, the process proceeds to step 1211 where updates are performed for the devices in the device dependency chain in accordance with the schedule.

It should be noted that it is possible in some iterations of step 1203 for there to be no devices having a lowest predicted workload in the time slot selected in step 1201 of that iteration. Such a situation may be handled in various ways. In some embodiments, that time slot is skipped such that no devices are scheduled for update during that time slot and processing moves to step 1209. In other embodiments, step 1203 identifies, from among devices not already scheduled for update, those with the lowest predicted workload in the selected time slot (even though the selected time slot may not correspond to the overall lowest predicted workload for any particular device in the device dependency chain).

In some embodiments, it is also possible that the number of devices in the subset identified in step 1203 exceeds some threshold. For example, there may be a case where all devices in the device dependency chain, or a large number of the devices in the device dependency chain, have their lowest predicted workload in the same time slot. In such a case, it may not be desirable to schedule all of the devices for update in the same time slot, and thus only some designated threshold number of devices is scheduled in that time slot, and the others are scheduled for update in their next lowest time slot. Thus, for any particular time slot there may be a threshold set as to the total number of devices that are capable of being updated in that time slot and only up to that threshold number of devices will be scheduled for update in that time slot. If the number of devices having their lowest predicted workload in a given time slot exceeds the threshold number of devices capable of being updated in the given time slot, such devices may be scheduled for update in the time slot corresponding to their next-lowest predicted workload.

Illustrative embodiments provide intelligent, systematic and programmatic techniques supported by a stable, scalable and fault-tolerant architecture for planning and installing upgrades (or performing other designated actions, such as maintenance actions) across devices in a data center or IT infrastructure where the data center or IT infrastructure may include hundreds or thousands of devices. To do so, some embodiments generate a directed weighted graph characterizing dependencies between the devices. This is used to formulate a device dependency chain. The embodiments also evaluate device redundancies to minimize impact of devices being offline during upgrades or other deployment scenarios.

The embodiments further support software/firmware upgrade granularity, as well as leveraging modern container technology, and implement a protection mechanism against upgrade failures and errors. An intelligent built-in backup mechanism stores device properties in specific files that can be read by any version of firmware, so as to ensures that despite any rollbacks, device remain connected and running.

Illustrative embodiments provide superior techniques that leverage weighted graphs based on analysis of computed device similarity scores from their activity patterns, which results in a robust, flexible, scalable and easy to maintain dynamically built device dependency chain. Thus, illustrative embodiments are able to proactively predict workload patterns for future device deployment slots based on past historical data using artificial intelligence and machine learning. Some embodiments therefore identify the optimum deployment slot for each device belonging to a device dependency chain. Advantageously, the embodiments further evaluate availability of redundant devices to minimize effects of devices being offline during upgrades, and provide fault-tolerant mechanisms to maintain devices in operational states following an upgrade or other deployment process.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining deployment schedules for operations to be performed on devices using device dependencies and redundancies will now be described in greater detail with reference to FIGS. 13 and 14. Although described in the context of system 100, these platforms may also be used to implement at least portions of other information processing systems in other embodiments.

Figure 13:
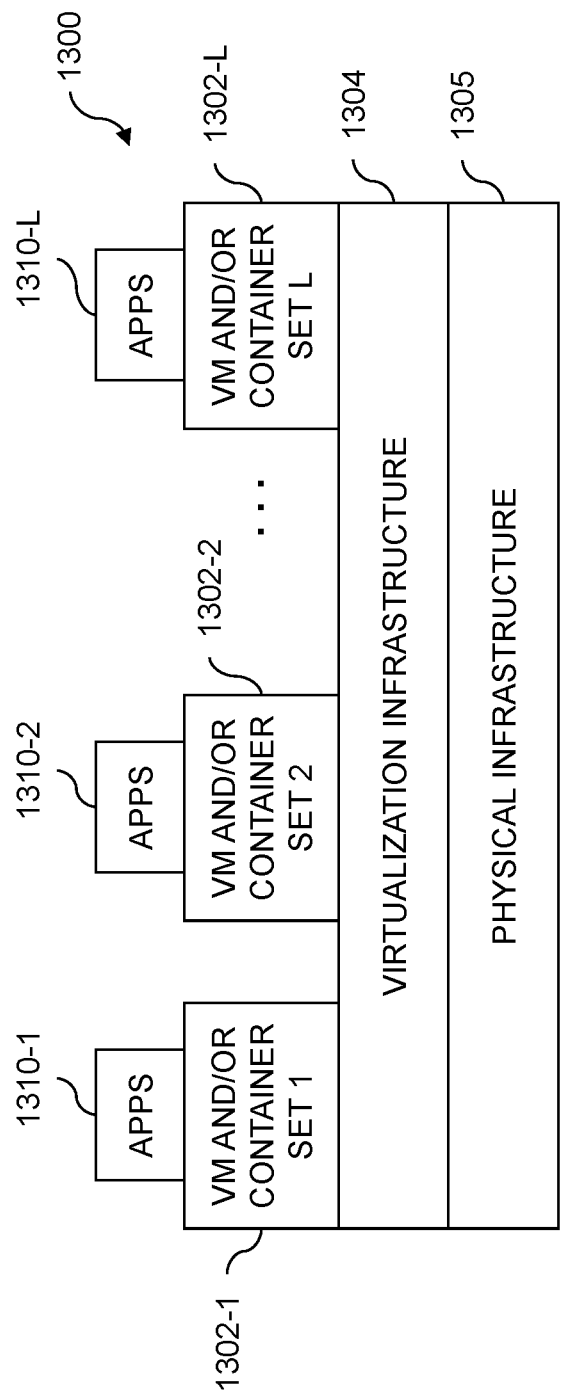
FIGS. 13 and 14 show examples of processing platforms that may be utilized to implement at least a portion of an information processing system in illustrative embodiments.
Figure 14:
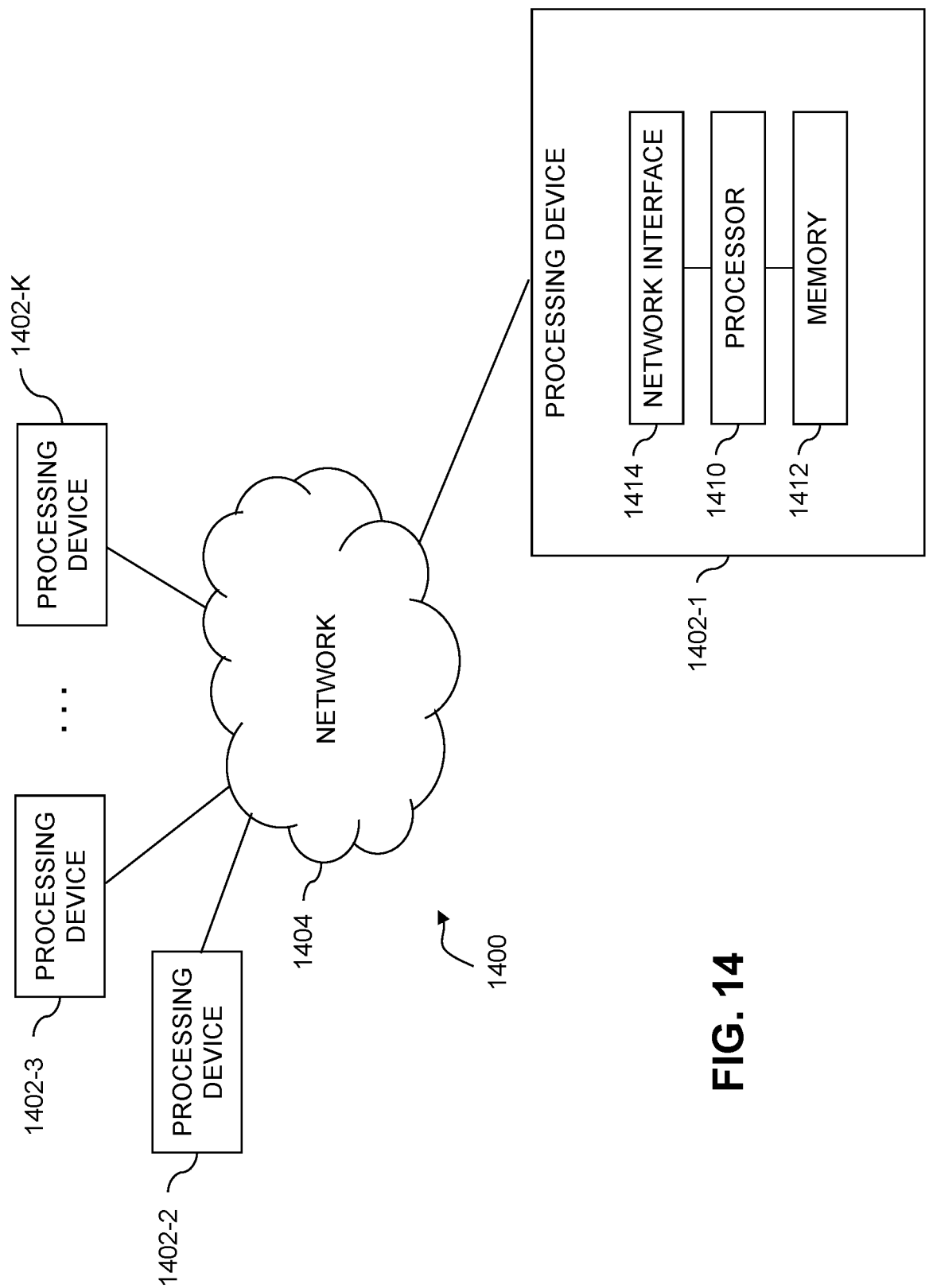

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining deployment schedules for operations to be performed on devices using device dependencies and redundancies as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, devices, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   generating a model of a plurality of devices in an information technology infrastructure, the generated model characterizing relationships between the plurality of devices;
   building a device dependency chain for the plurality of devices based at least in part on the generated model characterizing the relationships between the plurality of devices;
   predicting workload for each of the plurality of devices in one or more time slots of a given time period;
   determining a deployment schedule for the plurality of devices based at least in part on the device dependency chain and the predicted workload for each of the plurality of devices in the one or more time slots;
   utilizing the deployment schedule to select a device of the plurality of devices on which to perform an operation;
   determining whether the selected device corresponds to an additional device of the plurality of devices configured to operate in place of the selected device during performance of the operation; and
   controlling performance of the operation on the selected device responsive to the determination of whether the selected device corresponds to the additional device.

2. The apparatus of claim 1 wherein the plurality of devices comprise Internet of Things devices.

3. The apparatus of claim 1 wherein determining whether the selected device corresponds to the additional device comprises:
   analyzing configurations of the plurality of devices to build a device redundancy matrix comprising relationships between at least a subset of the plurality of devices identified as being able to operate in place of one or more devices in the subset; and
   identifying a relationship between the selected device and the additional device on the device redundancy matrix.

4. The apparatus of claim 1 wherein the operation comprises updating at least one application on the selected device.

5. The apparatus of claim 4 wherein the operation is performed using a rolling update mechanism responsive to an affirmative determination that the selected device corresponds to the additional device, and wherein performing the operation using the rolling update mechanism comprises:
   notifying the additional device of the operation to be performed on the selected device; and
   configuring an application on the additional device to operate in place of the at least one application on the selected device during the updating of the at least one application on the selected device.

6. The apparatus of claim 4 wherein the operation is performed using an in-place update mechanism responsive to a negative determination that the selected device corresponds to the additional device.

7. The apparatus of claim 1 wherein the model of the plurality of devices comprises a directed weighted graph with nodes representing the plurality of devices and edges between the nodes representing call relationships between the plurality of devices.

8. The apparatus of claim 7 wherein a given edge weight associated with a given edge between a first node and a second node in the directed weighted graph is based at least in part on a number of requests between the first node and the second node and an amount of data exchanged between the first node and the second node.

9. The apparatus of claim 1 wherein building the device dependency chain for the plurality of devices comprises computing an overall dependency score for each of the plurality of devices, the overall dependency score for a given device comprising a sum of pairwise dependency scores characterizing activity between the given device and each of at least a subset of other ones of the plurality of devices that have call relationships with the given device.

10. The apparatus of claim 1 wherein the given time period comprises a day, and the one or more time slots comprise hours in the day.

11. The apparatus of claim 1 wherein predicting the workload for each of the plurality of devices in the one or more time slots of the given time period comprises utilizing a machine learning regression analysis.

12. The apparatus of claim 11 wherein the machine learning regression analysis comprises a multivariate linear regression analysis.

13. The apparatus of claim 12 wherein the multivariate linear regression analysis is based at least in part on two or more of processor utilization of the plurality of devices, memory utilization of the plurality of devices, availability of the plurality of devices, response time of the plurality of devices, and disk utilization of the plurality of devices.

14. The apparatus of claim 1 wherein determining the deployment schedule comprises, for a given one of the one or more time slots of the given time period:
    identifying a subset of the devices whose lowest predicted workload is in the given time slot; and
    selecting an order in which the identified subset of the devices whose lowest predicted workload is in the given time slot in decreasing order of dependency scores obtained from the device dependency chain.

15. The apparatus of claim 1 wherein the deployment schedule specifies a sequence in which the operation is to be performed on the plurality of devices.

16. A computer program product comprising a non-transitory processor-readable storage medium having stored therein program code of one or more software programs, wherein the program code when executed by at least one processing device causes the at least one processing device to perform steps of:
    generating a model of a plurality of devices in an information technology infrastructure, the generated model characterizing relationships between the plurality of devices;
    building a device dependency chain for the plurality of devices based at least in part on the generated model characterizing the relationships between the plurality of devices;
    predicting workload for each of the plurality of devices in one or more time slots of a given time period;
    determining a deployment schedule for the plurality of devices based at least in part on the device dependency chain and the predicted workload for each of the plurality of devices in the one or more time slots;
    utilizing the deployment schedule to select a device of the plurality of devices on which to perform an operation;
    determining whether the selected device corresponds to an additional device of the plurality of devices configured to operate in place of the selected device during performance of the operation; and
    controlling performance of the operation on the selected device responsive to the determination of whether the selected device corresponds to the additional device.

17. The computer program product of claim 16 wherein determining whether the selected device corresponds to the additional device comprises:
    analyzing configurations of the plurality of devices to build a device redundancy matrix comprising relationships between at least a subset of the plurality of devices identified as being able to operate in place of one or more devices in the subset; and
    identifying a relationship between the selected device and the additional device on the device redundancy matrix.

18. The computer program product of claim 16 wherein:
    the operation comprises updating at least one application on the selected device;
    the operation is performed using a rolling update mechanism responsive to an affirmative determination that the selected device corresponds to the additional device; and
    performing the operation using the rolling update mechanism comprises:
        notifying the additional device of the operation to be performed on the selected device; and
        configuring an application on the additional device to operate in place of the at least one application on the selected device during the updating of the at least one application on the selected device.

19. A method comprising:
    generating a model of a plurality of devices in an information technology infrastructure, the generated model characterizing relationships between the plurality of devices;
    building a device dependency chain for the plurality of devices based at least in part on the generated model characterizing the relationships between the plurality of devices;
    predicting workload for each of the plurality of devices in one or more time slots of a given time period;
    determining a deployment schedule for the plurality of devices based at least in part on the device dependency chain and the predicted workload for each of the plurality of devices in the one or more time slots;
    utilizing the deployment schedule to select a device of the plurality of devices on which to perform an operation;
    determining whether the selected device corresponds to an additional device of the plurality of devices configured to operate in place of the selected device during performance of the operation; and
    controlling performance of the operation on the selected device responsive to the determination of whether the selected device corresponds to the additional device;
    wherein the method is performed by at least one processing device comprising a processor coupled to a memory.

20. The method of claim 19 wherein determining whether the selected device corresponds to the additional device comprises:
    analyzing configurations of the plurality of devices to build a device redundancy matrix comprising relationships between at least a subset of the plurality of devices identified as being able to operate in place of one or more devices in the subset; and
    identifying a relationship between the selected device and the additional device on the device redundancy matrix.

* * * * *